(12) United States Patent
Saito et al.

(10) Patent No.: US 9,988,539 B2
(45) Date of Patent: Jun. 5, 2018

(54) ACTIVE-ENERGY-RAY-CURABLE COMPOSITION, ACTIVE-ENERGY-RAY-CURABLE INK, COMPOSITION STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED MATERIAL, AND STRUCTURE

(71) Applicants: Shun Saito, Kanagawa (JP); Mihoko Matsumoto, Shizuoka (JP); Masayuki Koyano, Kanagawa (JP); Azumi Miyaake, Kanagawa (JP); Yuuki Mizutani, Kanagawa (JP); Mio Kumai, Tokyo (JP)

(72) Inventors: Shun Saito, Kanagawa (JP); Mihoko Matsumoto, Shizuoka (JP); Masayuki Koyano, Kanagawa (JP); Azumi Miyaake, Kanagawa (JP); Yuuki Mizutani, Kanagawa (JP); Mio Kumai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/338,940

(22) Filed: Oct. 31, 2016

(65) Prior Publication Data
US 2017/0137641 A1 May 18, 2017

(30) Foreign Application Priority Data

Nov. 12, 2015 (JP) .................................. 2015-221842
Jul. 20, 2016 (JP) .................................. 2016-142032

(51) Int. Cl.
| C08F 2/46 | (2006.01) |
| C08F 2/50 | (2006.01) |
| C08G 61/04 | (2006.01) |
| C09D 11/101 | (2014.01) |
| C09D 133/14 | (2006.01) |
| C09D 11/10 | (2014.01) |
| C09D 11/30 | (2014.01) |
| B33Y 70/00 | (2015.01) |
| B29C 64/165 | (2017.01) |

(52) U.S. Cl.
CPC .......... *C09D 11/101* (2013.01); *B29C 64/165* (2017.08); *B33Y 70/00* (2014.12); *C09D 11/10* (2013.01); *C09D 11/30* (2013.01); *C09D 133/14* (2013.01); *C08L 2312/06* (2013.01)

(58) Field of Classification Search
CPC ..... C09D 11/101; C09D 11/107; C09D 11/10; C09D 11/30; C09D 133/14; B41J 2/01; B33Y 70/00; B29C 64/165

USPC ............ 522/18, 12, 7, 6, 189, 184, 1; 520/1
See application file for complete search history.

(56) References Cited

U.S. PATENT DOCUMENTS

| 4,963,470 | A | * | 10/1990 | Klingert | .................. | C07F 17/00 |
| | | | | | | 430/194 |
| 5,952,152 | A | * | 9/1999 | Cunningham | .......... | C07F 5/027 |
| | | | | | | 430/281.1 |
| 8,632,174 | B2 | | 1/2014 | Noguchi et al. | | |
| 8,727,522 | B2 | | 5/2014 | Maekawa et al. | | |
| 8,926,082 | B2 | | 1/2015 | Hiraoka | | |
| 8,926,083 | B2 | | 1/2015 | Hiraoka | | |
| 8,926,084 | B2 | | 1/2015 | Hiraoka | | |
| 9,068,094 | B2 | | 6/2015 | Hiraoka | | |
| 9,120,946 | B2 | | 9/2015 | Seno et al. | | |
| 2004/0034115 | A1 | * | 2/2004 | Baudin | .................. | C07C 45/54 |
| | | | | | | 522/33 |
| 2005/0004249 | A1 | * | 1/2005 | Fuchs | ..................... | C07C 45/46 |
| | | | | | | 522/36 |
| 2005/0119435 | A1 | * | 6/2005 | Baudin | ..................... | C08F 2/46 |
| | | | | | | 528/25 |
| 2005/0239971 | A1 | * | 10/2005 | Husler | ..................... | C07C 45/46 |
| | | | | | | 525/293 |
| 2006/0100298 | A1 | * | 5/2006 | Ulrich | ................ | C07D 295/096 |
| | | | | | | 522/26 |

(Continued)

FOREIGN PATENT DOCUMENTS

| JP | 2003-213184 | 7/2003 |
| JP | 2003-292855 | 10/2003 |

(Continued)

OTHER PUBLICATIONS

U.S. Appl. No. 14/837,423, filed Aug. 27, 2015.
U.S. Appl. No. 15/042,928, filed Feb. 12, 2016.

*Primary Examiner* — Jessica Whiteley
(74) *Attorney, Agent, or Firm* — Oblon, McClelland, Maier & Neustadt, L.L.P.

(57) ABSTRACT

An active-energy-ray-curable composition including active-energy-ray-polymerizable compounds, wherein the active-energy-ray-polymerizable compounds include a monofunctional monomer, a bifunctional monomer, and a trifunctional monomer, and wherein the monofunctional monomer, the bifunctional monomer, and the trifunctional monomer satisfy conditions (1) and (2) below: (1) [number of functional groups derived from the monofunctional monomer]>[number of functional groups derived from the bifunctional monomer]>[number of functional groups derived from the trifunctional monomer]; and (2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

12 Claims, 2 Drawing Sheets

(56) References Cited

U.S. PATENT DOCUMENTS

| | | | | |
|---|---|---|---|---|
| 2006/0270748 A1* | 11/2006 | Sommerlade | C07C 45/46 | 522/6 |
| 2009/0214871 A1* | 8/2009 | Fukuda | C09D 4/00 | 428/413 |
| 2011/0033664 A1* | 2/2011 | Dicker | B41F 11/02 | 428/142 |
| 2011/0262675 A1* | 10/2011 | Inamiya | B32B 38/06 | 428/41.8 |
| 2012/0029107 A1* | 2/2012 | Berens | C07C 45/63 | 522/20 |
| 2012/0035292 A1* | 2/2012 | Onclin | C08F 2/50 | 522/79 |
| 2012/0142793 A1* | 6/2012 | Frey | C07F 7/21 | 521/50.5 |
| 2012/0147103 A1 | 6/2012 | Hasegawa et al. | | |
| 2012/0200648 A1 | 8/2012 | Hiraoka et al. | | |
| 2012/0242768 A1 | 9/2012 | Seno et al. | | |
| 2013/0321539 A1 | 12/2013 | Hiraoka | | |
| 2014/0002539 A1 | 1/2014 | Goto et al. | | |
| 2014/0240414 A1 | 8/2014 | Hiraoka | | |
| 2014/0327719 A1 | 11/2014 | Hiraoka | | |
| 2014/0336298 A1 | 11/2014 | Hiraoka | | |
| 2014/0338562 A1 | 11/2014 | Hiraoka | | |
| 2015/0009265 A1 | 1/2015 | Kohzuki et al. | | |
| 2015/0042731 A1 | 2/2015 | Hiraoka | | |
| 2015/0077481 A1 | 3/2015 | Yoshino et al. | | |
| 2015/0099819 A1 | 4/2015 | Hiraoka | | |
| 2015/0126636 A1 | 5/2015 | Hiraoka | | |
| 2015/0130878 A1 | 5/2015 | Kohzuki et al. | | |
| 2015/0232675 A1 | 8/2015 | Yoshino et al. | | |
| 2015/0232676 A1 | 8/2015 | Hiraoka | | |
| 2015/0232677 A1 | 8/2015 | Hiraoka | | |
| 2015/0329729 A1 | 11/2015 | Hiraoka | | |
| 2016/0009931 A1 | 1/2016 | Kohzuki et al. | | |
| 2016/0075895 A1 | 3/2016 | Kohzuki et al. | | |
| 2016/0102216 A1 | 4/2016 | Hirade et al. | | |
| 2016/0185987 A1* | 6/2016 | Saito | B32B 27/06 | 428/195.1 |

FOREIGN PATENT DOCUMENTS

| | | |
|---|---|---|
| JP | 2011-252053 | 12/2011 |
| JP | 2012-207202 | 10/2012 |
| JP | 2013-027672 | 2/2013 |
| JP | 2015-083656 | 4/2015 |

* cited by examiner

ACTIVE-ENERGY-RAY-CURABLE COMPOSITION, ACTIVE-ENERGY-RAY-CURABLE INK, COMPOSITION STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED MATERIAL, AND STRUCTURE

CROSS-REFERENCE TO RELATED APPLICATIONS

The present application claims priority under 35 U.S.C. § 119 to Japanese Patent Application No. 2015-221842, filed Nov. 12, 2015 and Japanese Patent Application No. 2016-142032, filed Jul. 20, 2016. The contents of which are incorporated herein by reference in their entirety.

BACKGROUND OF THE INVENTION

Field of the Invention

The present disclosure relates to an active-energy-ray-curable composition, an active-energy-ray-curable ink, a composition stored container, a two-dimensional or three-dimensional image forming apparatus, a two-dimensional or three-dimensional image forming method, a cured material, and a structure.

Description of the Related Art

In recent years, it has been considered that aqueous inkjet inks and solvent inkjet inks are replaced with inkjet inks including active-energy-ray-curable compositions having relatively low volatilities.

In recent years, there has increasingly been a demand that active-energy-ray-curable inkjet inks can be printed by inkjet printing methods on substrates to be subjected to, for example, drawing process or punching process.

Japanese Unexamined Patent Application Publication No. 2015-83656 has proposed an active-energy-ray-curable ink that forms a cured material achieving all of close adhesiveness to a substrate, hardness, and drawability. This active-energy-ray-curable ink includes a monofunctional polymerizable monomer, a homopolymer of which has a grass transition temperature of 90° C. or more. When a coated film of the above active-energy-ray-curable ink is formed on a polycarbonate substrate so as to have an average thickness of 10 μm and is cured after 15 seconds by applying active energy rays (quantity of light: 1,500 mJ/cm$^2$) to the coated film, the resultant cured material satisfies the following: 1) when the cured material is drawn by a tensile tester at a tension speed of 20 mm/min and a temperature of 180° C., drawability of the cured material, which is obtained by dividing the length before the tension test by the length after the tension test, is 2 or more; and 2) close adhesiveness between the polycarbonate substrate and the cured material, which is measured according to the cross-cut test of JIS K5400, is 70 or more.

Japanese Unexamined Patent Application Publication No. 2011-252053 has proposed: an active-energy-ray-curable inkjet ink composition being easily formed into an ink, having low viscosity, achieving high safety, and being excellent in curing ability and close adhesiveness to a substrate; and a cured material of the active-energy-ray-curable inkjet ink composition being excellent in balance between film strength and dimensional stability. This active-energy-ray-curable inkjet ink composition includes liquid polymerizable monomers that can be cured with active energy rays and has viscosity of from 3 mPa·s through 70 mPa·s at 25° C. The polymerizable monomers include: (a) a multifunctional monomer being a hexafunctional or more monomer and including six or more ethylenically double bond groups in a molecule; (b) a bifunctional monomer including two ethylenically double bond groups in a molecule in an amount of from 60 parts by mass through 500 parts by mass relative to 100 parts by mass of the (a) multifunctional monomer; and (c) a monofunctional monomer including one ethylenically double bond group in a molecule in an amount of from 0 parts by mass through 15 parts by mass relative to 100 parts by mass of the (a) multifunctional monomer.

SUMMARY OF THE INVENTION

According to one aspect of the present disclosure, an active-energy-ray-curable composition including active-energy-ray-polymerizable compounds is provided. The active-energy-ray-polymerizable compounds include a monofunctional monomer, a bifunctional monomer, and a trifunctional monomer. The monofunctional monomer, the bifunctional monomer, and the trifunctional monomer satisfy conditions (1) and (2) below:
(1) [number of functional groups derived from the monofunctional monomer]>[number of functional groups derived from the bifunctional monomer]>[number of functional groups derived from the trifunctional monomer]; and
(2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

Figure 1:
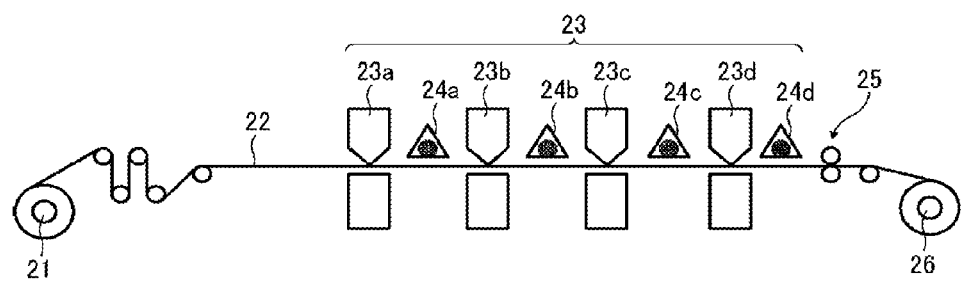
FIG. 1 is a schematic view of an example of an image forming apparatus of the present disclosure.

DESCRIPTION OF THE EMBODIMENTS (Active-Energy-Ray-Curable Composition)
An active-energy-ray-curable composition of the present disclosure is an active-energy-ray-curable composition including active-energy-ray-polymerizable compounds. The active-energy-ray-polymerizable compounds include a monofunctional monomer, a bifunctional monomer, and a trifunctional monomer. The monofunctional monomer, the bifunctional monomer, and the trifunctional monomer satisfy conditions (1) and (2) below:
(1) [number of functional groups derived from the monofunctional monomer]>[number of functional groups derived from the bifunctional monomer]>[number of functional groups derived from the trifunctional monomer]; and (2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

Drawability of a cured material of the active-energy-ray-curable composition is preferably 100% or more, more preferably 150% or more.

The active-energy-ray-curable composition of the present disclosure is based on the following finding. Specifically, a cured film of an active-energy-ray-curable composition including the existing monofunctional active-energy-ray-polymerizable compound and the existing multifunctional active-energy-ray-polymerizable compound is high in hardness of a coated film. Therefore, when drawing process is performed after printing, the cured film cannot follow the deformed substrate; i.e., the printed matter is deteriorated in drawing process property.

The existing active-energy-ray-curable compositions are considerably deteriorated in drawing process property compared to the existing solvent inks. Therefore, in particular, in application fields requiring high quality in which molding process is required, although the active-energy-ray-curable compositions are expected to replace the solvent inks, there has been the situation that drastic replacement does not proceed.

The present invention has an object to provide an active-energy-ray-curable composition that can form a cured material excellent in drawability and solvent resistance.

According to the present disclosure, it is possible to provide an active-energy-ray-curable composition that can form a cured material excellent in drawability and solvent resistance.

Monomers constituting an active-energy-ray-curable composition of the present disclosure will be described below.

<Monofunctional Monomer>

The monofunctional monomer may be appropriately selected depending on the intended purpose. Examples of the monofunctional monomer include hydroxyethyl (meth)acrylamide, isobornyl (meth)acrylate, adamantyl (meth)acrylate, 2-methyl-2-adamantyl (meth)acrylate, (meth)acryloyl morpholine, dimethylaminopropyl (meth)acrylamide, dicyclopentenyl (meth)acrylate, dicyclopentanyl (meth)acrylate, dicyclopentenyl oxyethyl (meth)acrylate, and tetrahydrofurfuryl (meth)acrylate. These may be used alone or in combination.

<Bifunctional Monomer>

Examples of the bifunctional monomer include neopentyl glycol di(meth)acrylate, (poly)ethylene glycol di(meth)acrylate, diethylene glycol di(meth)acrylate, triethylene glycol di(meth)acrylate, tetraethylene glycol di(meth)acrylate, polypropylene glycol di(meth)acrylate, (poly)tetramethylene glycol di(meth)acrylate, bisphenol A propylene oxide (PO) adduct di(meth)acrylate, ethoxylated neopentyl glycol di(meth)acrylate, propoxylated neopentyl glycol di(meth)acrylate, bisphenol A ethylene oxide (EO) adduct di(meth)acrylate, 1,6-hexanediol di(meth)acrylate, 1,9-nonanediol di(meth)acrylate, 1,3-butylene glycol di(meth)acrylate, 1,10-decanediol di(meth)acrylate, and hydroxypivalic acid neopentyl glycol di(meth)acrylate. These may be used alone or in combination.

<Trifunctional Monomer>

Examples of the trifunctional monomer include EO-modified pentaerythritol tri(meth)acrylate, PO-modified pentaerythritol tri(meth)acrylate, trimethylolethane tri(meth)acrylate, trimethylolpropane tri(meth)acrylate, and triallyl trimellitate. These may be used alone or in combination.

<Hexafunctional Monomer>

Incorporation of a hexafunctional monomer into the ink can improve the cured material in solvent resistance.

An amount of the hexafunctional monomer is preferably from 1% by mass through 5% by mass relative to the total amount of the monomers.

Examples of the hexafunctional monomer include dipentaerythritol hexa(meth)acrylate, caprolactone-modified dipentaerythritol hexa(meth)acrylate, and sorbitol hexa(meth)acrylate. These may be used alone or in combination. Sorbitol hexa(meth)acrylate is most desirable because favorable cross-linkage is formed.

<Functional Group Ratio>

In the present disclosure, "functional group ratio" is defined by the following formula:

[number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

The sum of a functional group ratio derived from the monofunctional monomer, a functional group ratio derived from the bifunctional monomer, and a functional group ratio derived from the trifunctional monomer is always 1. A standard deviation among the functional group ratio derived from the monofunctional monomer, the functional group ratio derived from the bifunctional monomer, and the functional group ratio derived from the trifunctional monomer is from 0.003 through 0.030, preferably from 0.009 through 0.014. The value of this standard deviation is such a range that can achieve both drawability and solvent resistance.

<Method for Analyzing Monomer>

One exemplary method for analyzing monomer formulations is gas chromatography. Qualitative analysis is performed and monomers are identified from contents. Quantitative analysis can be performed by obtaining a calibration curve.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Polyrotaxane Resin>

A polyrotaxane resin is called Slide-Ring Material and is a resin having the below-described structure: a linear molecule of a straight chain polymer penetrates through a hole of a macroccyclic compound (e.g., cyclodextrin); a bulky portion such as an adamantane group is bound to both terminals of the straight chain polymer; and this bulky portion functions as a stopper so as to prevent the macroccyclic compound from leaving. Examples of the polyrotaxane resin include SUPER POLYMER series (available from Advanced Softmaterials Inc.) that are commercially available products. Compared to the existing polymers, the macroccyclic compound can freely slide. Therefore, the polyrotaxane resin has drawability and is hardly broken. Examples of the core polymer include polyethylene glycol, polyalkane, polyester, and straight chain silicone. Examples of the macroccyclic compound include cyclodextrin, crown ether, and cyclosiloxane. Polyrotaxane obtained by combining polyethylene glycol with cyclodextrin is desirable in terms of durability and intermolecular force between resins.

An amount of the polyrotaxane is preferably 1% by mass or more but 10% by mass or less.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOM SANGYO CO., LTD.) using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
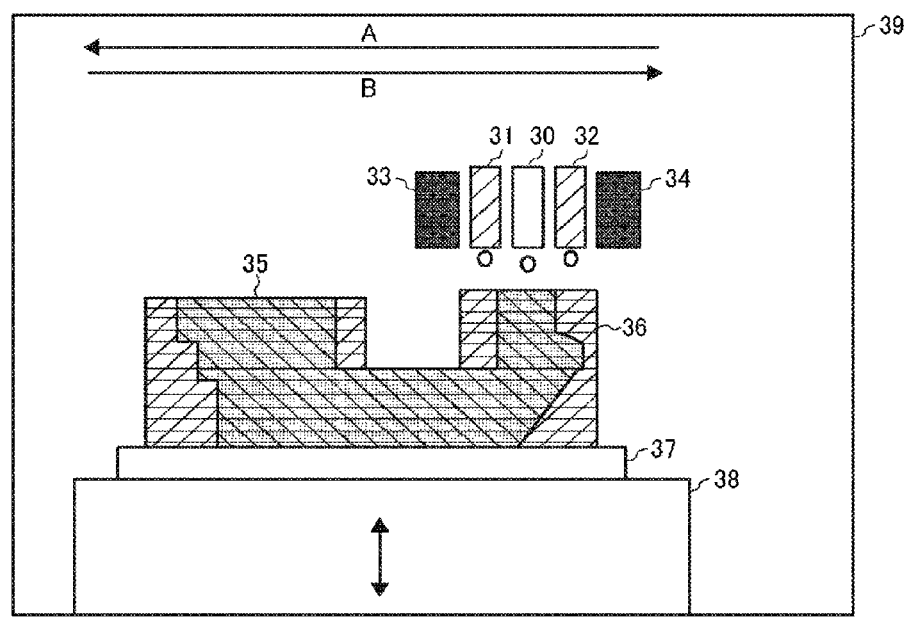
FIG. 2 is a schematic view of an example of another image forming apparatus of the present disclosure.
Figure 3A:
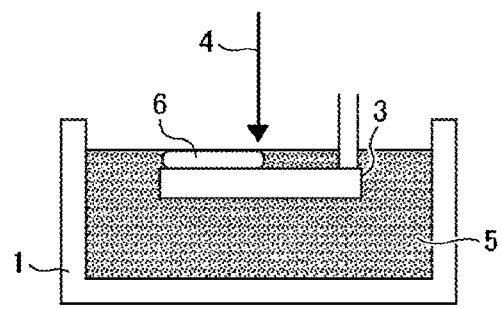
FIG. 3A is a schematic view of an example of still another image forming apparatus of the present disclosure.
Figure 3B:
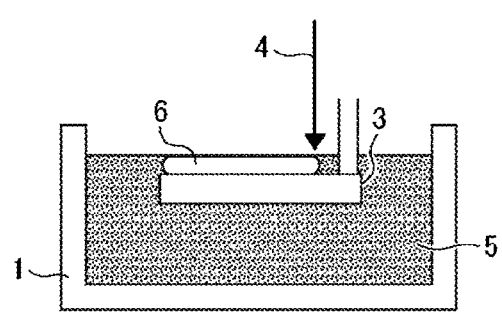
FIG. 3B is a schematic view of an example of still another image forming apparatus of the present disclosure.
Figure 3C:
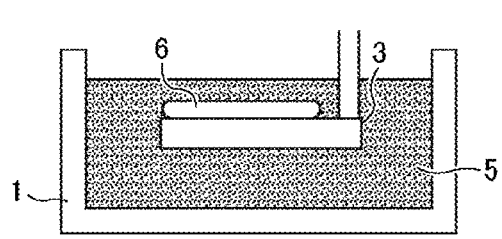
FIG. 3C is a schematic view of an example of still another image forming apparatus of the present disclosure.
Figure 3D:
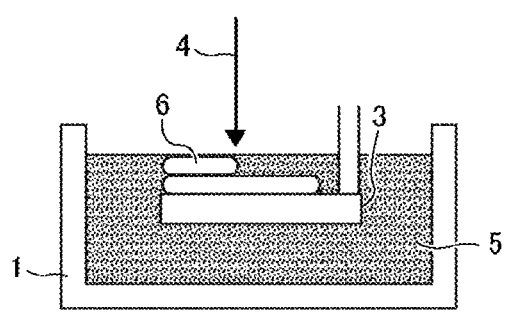
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

EXAMPLES

The present disclosure will be described in more detail by way of the following Examples and Comparative Examples. However, the present disclosure should not be construed as being limited to these Examples.

Cases of using active-energy-ray-curable compositions as active-energy-ray-curable inks will be described below.

Examples 1 to 14 and Comparative Examples 1 to 5

—Preparation of Active-Energy-Ray-Curable Inkjet Ink—

Materials described in the following Table 1 were added sequentially under stirring. After stirring of the materials for 1 hour, it was confirmed that there was not any material that remained undissolved. Then, the resultant solution was filtrated through a membrane filter, and coarse particles causing a head clogging were removed to obtain active-energy-ray-curable inkjet inks of Examples 1 to 14 and Comparative Examples 1 to 5.

In Table 1, the values of "amount charged" of the active-energy-ray-polymerizable compounds are expressed in "parts by mass".

As a photopolymerization initiator, 2,4,6-trimethylbenzoyldiphenyl-5-phosphine oxide (5 parts) and 1-phenyl-2-hydroxy-2-methylpropane (5 parts) were added relative to the total amount of monomers (100 parts). Polyrotaxane used was SUPER POLYMER SH1310P (available from Advanced Softmaterials Inc.).

Next, the prepared active-energy-ray-curable inkjet inks were each used to prepare cured materials in the following manner.

An inkjet ejecting device equipped with a GEN 4 head (available from Ricoh Printing Systems Ltd.) was used to eject each active-energy-ray-curable inkjet ink on a polycarbonate substrate (IUPILON 100FE2000 masking, thickness 100 µm, available from Mitsubishi Engineering-Plastics Corporation) so as to have an average thickness of 10 µm. Immediately after the ejecting of the active-energy-ray-curable inkjet ink, the active-energy-ray-curable inkjet ink was irradiated with ultraviolet rays (light quantity: 1,500 mJ/cm$^2$) emitted by an UV irradiator LH6 (available from Fusion Systems Japan) to obtain a cured material.

The obtained cured material was evaluated for drawability and solvent resistance in the following manners. Results are presented in Table 2.

<Evaluation of Drawability>

In the present disclosure, drawability was evaluated by subjecting the cured material to 180° breaking elongation (tensile test).

A tensile tester (AUTOGRAPH AGS-5KNX, available from SHIMADZU CORPORATION) was used to measure a dumbbel-shaped cured material under the following conditions: tension speed: 20 mm/min, temperature: 180° C., sample: dumbbell-shaped sample (No. 6) according to JIS K6251. The cured material was evaluated for drawability based on the following calculation formula.

$$\text{(Length after tension test–length before tension test)/(length before tension test)} \times 100$$

[Evaluation Criteria]
A: 150% or more
B: 105% or more but less than 150%
C: Less than 105%

<Solvent Resistance>

A glass slide (26×76 mm, thickness: 0.9 mm through 1.2 mm) was subjected to heat-washing at 450° C./3 minutes and was measured for the mass of the glass slide.

The ink was printed on this glass slide by inkjet printing to prepare a solid coated film. The solid coated film was subjected to photo-curing at an integral of light of 0.3 J/cm$^2$ (when larger quantity of light was necessary for curing, minimum quantity of light necessary for curing was applied to the solid coated film).

The mass of the glass slide on which this cured material had been formed was measured to calculate mass of the cured material before the test (W1) based on the following calculation formula: [mass of (glass slide+cured material)–mass of glass slide].

Next, the entire glass slide on which the cured material had been formed was immersed in a solvent (about 200 mL) and was left to stand at 5° C. for 18 hours.

The glass slide on which the cured material had been formed was taken out, was sufficiently washed with an agent and dried, and then was measured to calculate mass of the cured material after the test (W2) based on the calculation formula: [mass of (glass slide+cured material)−mass of glass slide].

Next, a percentage of change in mass of the cured material was calculated based on the following calculation formula.

Here, the smaller the percentage of change in mass is, the better the solvent resistance is.

Percentage of change in mass (%)=[(W1−W2)/W1]×100

Acetone or toluene was used as the solvent in the above test.

TABLE 1

| | | Monofunctional monomer | | Bifunctional monomer | | Trifunctional monomer |
|---|---|---|---|---|---|---|
| | | Adamantyl methacrylate | Tetrahydrofurfuryl methacrylate | Diethylene glycol di(meth)acrylate | 1,6-Hexanediol di(meth)acrylate | Trimethylol propane tri(meth)acrylate |
| | | | | Monomer molecular weight | | |
| | | 206 | 170 | 242 | 254 | 338 |
| Example 1 | Amount charged | 76.0 | | 80.4 | | 101.0 |
| | Functional group equivalent | 100 | | 90 | | 81 |
| | Functional group existence ratio | 0.369 | | 0.332 | | 0.299 |
| Example 2 | Amount charged | | 62.7 | | 84.4 | 101.0 |
| | Functional group equivalent | | 100 | | 90 | 81 |
| | Functional group existence ratio | | 0.369 | | 0.332 | 0.299 |
| Example 3 | Amount charged | 69.4 | | 80.7 | | 111.5 |
| | Functional group equivalent | 100 | | 99 | | 98 |
| | Functional group existence ratio | 0.337 | | 0.333 | | 0.330 |
| Example 4 | Amount charged | | 57.2 | | 84.7 | 111.5 |
| | Functional group equivalent | | 100 | | 99 | 98 |
| | Functional group existence ratio | | 0.337 | | 0.333 | 0.330 |
| Example 5 | Amount charged | 73.6 | | 78.7 | | 107.4 |
| | Functional group equivalent | 100 | | 91 | | 89 |
| | Functional group existence ratio | 0.357 | | 0.325 | | 0.318 |
| Example 6 | Amount charged | | 60.7 | | 82.6 | 107.4 |
| | Functional group equivalent | | 100 | | 91 | 89 |
| | Functional group existence ratio | | 0.357 | | 0.325 | 0.318 |
| Example 7 | Amount charged | 70.5 | | 81.2 | | 108.8 |
| | Functional group equivalent | 100 | | 98 | | 94 |
| | Functional group existence ratio | 0.342 | | 0.336 | | 0.322 |
| Example 8 | Amount charged | | 58.2 | | 85.2 | 108.8 |
| | Functional group equivalent | | 100 | | 98 | 94 |
| | Functional group existence ratio | | 0.342 | | 0.336 | 0.322 |
| Example 9 | Amount charged | 72.3 | | 80.7 | | 106.7 |
| | Functional group equivalent | 100 | | 95 | | 90 |
| | Functional group existence ratio | 0.351 | | 0.333 | | 0.316 |
| Example 10 | Amount charged | | 59.6 | | 84.7 | 106.7 |
| | Functional group equivalent | | 100 | | 95 | 90 |
| | Functional group existence ratio | | 0.351 | | 0.333 | 0.316 |
| Example 11 | Amount charged | 72.3 | | 80.7 | | 106.7 |
| | Functional group equivalent | 100 | | 95 | | 90 |
| | Functional group existence ratio | 0.351 | | 0.333 | | 0.316 |
| Example 12 | Amount charged | 72.3 | | 80.7 | | 106.7 |
| | Functional group equivalent | 100 | | 95 | | 90 |
| | Functional group existence ratio | 0.351 | | 0.333 | | 0.316 |

TABLE 1-continued

| | | | | |
|---|---|---|---|---|
| Example 13 | Amount charged | 72.3 | 80.7 | 106.7 |
| | Functional group equivalent | 100 | 95 | 90 |
| | Functional group existence ratio | 0.351 | 0.333 | 0.316 |
| Example 14 | Amount charged | 72.3 | 80.7 | 106.7 |
| | Functional group equivalent | 100 | 95 | 90 |
| | Functional group existence ratio | 0.351 | 0.333 | 0.316 |
| Comparative Example 1 | Amount charged | 72.3 | 76.4 | 112.7 |
| | Functional group equivalent | 100 | 90 | 95 |
| | Functional group existence ratio | 0.361 | 0.316 | 0.333 |
| Comparative Example 2 | Amount charged | 76.6 | 81.0 | 99.3 |
| | Functional group equivalent | 100 | 90 | 79 |
| | Functional group existence ratio | 0.372 | 0.335 | 0.294 |
| Comparative Example 3 | Amount charged | 68.7 | 80.7 | 112.7 |
| | Functional group equivalent | 100 | 100 | 100 |
| | Functional group existence ratio | 0.333 | 0.333 | 0.333 |
| Comparative Example 4 | Amount charged | 114.4 | 0.0 | 150.2 |
| | Functional group equivalent | 100 | 0 | 80 |
| | Functional group existence ratio | 0.556 | 0.000 | 0.444 |
| Comparative Example 5 | Amount charged | 114.4 | 107.6 | 0.0 |
| | Functional group equivalent | 100 | 80 | 0 |
| | Functional group existence ratio | 0.556 | 0.444 | 0.000 |

| | | Hexafunctional monomer | | | |
|---|---|---|---|---|---|
| | | Dipenta erythritol hexaacrylate | Sorbitol hexaacrylate | Polyrotaxane | |
| | | Monomer molecular weight | | | |
| | | 578 | 590 | — | Standard deviation |
| Example 1 | Amount charged | | | | 0.029 |
| | Functional group equivalent | | | | |
| | Functional group existence ratio | | | | |
| Example 2 | Amount charged | | | | 0.029 |
| | Functional group equivalent | | | | |
| | Functional group existence ratio | | | | |
| Example 3 | Amount charged | | | | 0.003 |
| | Functional group equivalent | | | | |
| | Functional group existence ratio | | | | |
| Example 4 | Amount charged | | | | 0.003 |
| | Functional group equivalent | | | | |
| | Functional group existence ratio | | | | |
| Example 5 | Amount charged | | | | 0.017 |
| | Functional group equivalent | | | | |
| | Functional group existence ratio | | | | |
| Example 6 | Amount charged | | | | 0.017 |
| | Functional group equivalent | | | | |
| | Functional group existence ratio | | | | |
| Example 7 | Amount charged | | | | 0.009 |
| | Functional group equivalent | | | | |
| | Functional group existence ratio | | | | |

TABLE 1-continued

| | | | | | |
|---|---|---|---|---|---|
| Example 8 | Amount charged | | | | 0.009 |
| | Functional group equivalent | | | | |
| | Functional group existence ratio | | | | |
| Example 9 | Amount charged | | | | 0.014 |
| | Functional group equivalent | | | | |
| | Functional group existence ratio | | | | |
| Example 10 | Amount charged | | | | 0.014 |
| | Functional group equivalent | | | | |
| | Functional group existence ratio | | | | |
| Example 11 | Amount charged | 10 | | | 0.014 |
| | Functional group equivalent | | | | |
| | Functional group existence ratio | | | | |
| Example 12 | Amount charged | | 10 | | 0.014 |
| | Functional group equivalent | | | | |
| | Functional group existence ratio | | | | |
| Example 13 | Amount charged | | | 1 | 0.014 |
| | Functional group equivalent | | | | |
| | Functional group existence ratio | | | | |
| Example 14 | Amount charged | | | 10 | 0.014 |
| | Functional group equivalent | | | | |
| | Functional group existence ratio | | | | |
| Comparative Example 1 | Amount charged | | | | 0.014 |
| | Functional group equivalent | | | | |
| | Functional group existence ratio | | | | |
| Comparative Example 2 | Amount charged | | | | 0.032 |
| | Functional group equivalent | | | | |
| | Functional group existence ratio | | | | |
| Comparative Example 3 | Amount charged | | | | 0.000 |
| | Functional group equivalent | | | | |
| | Functional group existence ratio | | | | |
| Comparative Example 4 | Amount charged | | | | 0.240 |
| | Functional group equivalent | | | | |
| | Functional group existence ratio | | | | |
| Comparative Example 5 | Amount charged | | | | 0.240 |
| | Functional group equivalent | | | | |
| | Functional group existence ratio | | | | |

TABLE 2

| | | | | | | | | Solvent resistance | | | |
|---|---|---|---|---|---|---|---|---|---|---|---|
| | | | | | | | | Acetone | | Toluene | |
| | | | | | | Drawability | | Percentage of change | | Percentage of change | |
| | Monofunctional monomer | | Bifunctional monomer | | Trifunctional monomer | Standard deviation | Drawing (%) | Evaluation | in mass (%) | Evaluation | in mass (%) | Evaluation |
| Example 1 | 0.369 | > | 0.332 | > | 0.299 | 0.029 | 200 | A | 5 | B | 6 | B |
| Example 2 | 0.369 | > | 0.332 | > | 0.299 | 0.029 | 180 | A | 4 | B | 5 | B |
| Example 3 | 0.337 | > | 0.333 | > | 0.330 | 0.003 | 160 | A | 2 | B | 2 | B |
| Example 4 | 0.337 | > | 0.333 | > | 0.330 | 0.003 | 140 | B | 2 | B | 2 | B |

TABLE 2-continued

|  | Mono-functional monomer |  | Bifunctional monomer |  | Trifunctional monomer | Standard deviation | Drawability | | Solvent resistance | | | |
|---|---|---|---|---|---|---|---|---|---|---|---|---|
|  |  |  |  |  |  |  | | | Acetone | | Toluene | |
|  |  |  |  |  |  |  | Drawing (%) | Evaluation | Percentage of change in mass (%) | Evaluation | Percentage of change in mass (%) | Evaluation |
| Example 5 | 0.357 | > | 0.325 | > | 0.318 | 0.017 | 180 | A | 3 | B | 4 | B |
| Example 6 | 0.357 | > | 0.325 | > | 0.318 | 0.017 | 160 | A | 3 | B | 4 | B |
| Example 7 | 0.342 | > | 0.336 | > | 0.322 | 0.009 | 110 | B | 1 | A | 2 | B |
| Example 8 | 0.342 | > | 0.336 | > | 0.322 | 0.009 | 105 | B | 0 | A | 0 | A |
| Example 9 | 0.351 | > | 0.333 | > | 0.316 | 0.014 | 170 | A | 2 | B | 3 | B |
| Example 10 | 0.351 | > | 0.333 | > | 0.316 | 0.014 | 155 | A | 2 | B | 2 | B |
| Example 11 | 0.351 | > | 0.333 | > | 0.316 | 0.014 | 160 | A | 1 | A | 1 | A |
| Example 12 | 0.351 | > | 0.333 | > | 0.316 | 0.014 | 165 | A | 0 | A | 0 | A |
| Example 13 | 0.351 | > | 0.333 | > | 0.316 | 0.014 | 170 | A | 0 | A | 0 | A |
| Example 14 | 0.351 | > | 0.333 | > | 0.316 | 0.014 | 195 | A | 0 | A | 0 | A |
| Comparative Example 1 | 0.351 | > | 0.316 | < | 0.333 | 0.014 | 100 | C | 0 | A | 0 | A |
| Comparative Example 2 | 0.372 | > | 0.335 | > | 0.294 | 0.032 | 200 | A | 10 | C | 14 | C |
| Comparative Example 3 | 0.333 | = | 0.333 | = | 0.333 | 0.000 | 100 | C | 0 | A | 0 | A |
| Comparative Example 4 | 0.556 | > | 0 | < | 0.444 | 0.240 | 100 | C | 0 | A | 0 | A |
| Comparative Example 5 | 0.556 | > | 0.444 | > | 0.000 | 0.240 | 105 | B | 18 | C | 42 | C |

What is claimed is:

1. An active-energy-ray-curable composition, comprising active-energy-ray-polymerizable compounds,
wherein the active-energy-ray-polymerizable compounds comprise a monofunctional monomer, a bifunctional monomer, and a trifunctional monomer, and
wherein the monofunctional monomer, the bifunctional monomer, and the trifunctional monomer satisfy conditions (1) and (2) below:
(1) [number of functional groups derived from the monofunctional monomer]>[number of functional groups derived from the bifunctional monomer]>[number of functional groups derived from the trifunctional monomer]; and
(2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

2. The active-energy-ray-curable composition according to claim 1,
wherein the standard deviation is from 0.009 through 0.014.

3. The active-energy-ray-curable composition according to claim 1,
wherein a cured material of the active-energy-ray-curable composition has drawability of 100% or more.

4. The active-energy-ray-curable composition according to claim 1, further comprising a hexafunctional monomer.

5. The active-energy-ray-curable composition according to claim 4,
wherein the hexafunctional monomer is sorbitol hexaacrylate.

6. An active-energy-ray-curable ink, comprising an active-energy-ray-curable composition,
wherein the active-energy-ray-curable composition comprises active-energy-ray-polymerizable compounds,
wherein the active-energy-ray-polymerizable compounds comprise a monofunctional monomer, a bifunctional monomer, and a trifunctional monomer, and
wherein the monofunctional monomer, the bifunctional monomer, and the trifunctional monomer satisfy conditions (1) and (2) below:
(1) [number of functional groups derived from the monofunctional monomer]>[number of functional groups derived from the bifunctional monomer]>[number of functional groups derived from the trifunctional monomer]; and
(2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

7. A composition stored container, comprising:
an active-energy-ray-curable composition; and
a container comprising the active-energy-ray-curable composition, wherein the active-energy-ray-curable composition comprises active-energy-ray-polymerizable compounds,
wherein the active-energy-ray-polymerizable compounds comprise a monofunctional monomer, a bifunctional monomer, and a trifunctional monomer, and
wherein the monofunctional monomer, the bifunctional monomer, and the trifunctional monomer satisfy conditions (1) and (2) below:
(1) [number of functional groups derived from the monofunctional monomer]>[number of functional groups derived from the bifunctional monomer]>[number of functional groups derived from the trifunctional monomer]; and (2) a standard deviation of functional group ratios is from 0.003 through 0.030, the functional group ratios being expressed by [number of functional groups derived from N-functional monomer]/([number of functional groups derived from the monofunctional monomer]+[number of functional groups derived from the bifunctional monomer]+[number of functional groups derived from the trifunctional monomer]), the N being mono, bi, or tri.

8. A two-dimensional or three-dimensional image forming apparatus comprising:
   a storing part comprising the composition according to claim 1; and
   an irradiator configured to emit active energy rays.

9. A two-dimensional or three-dimensional image forming method, comprising
   irradiating the composition according to claim 1 with active energy rays.

10. A cured material, wherein the cured material is obtained by curing the composition according to claim 1.

11. A structure comprising:
    a substrate; and
    a cured material obtained by curing the composition according to claim 1.

12. The active-energy-ray-curable composition according to claim 1,
    wherein the active-energy-ray-curable composition comprises polyrotaxane in an amount of 1% by mass or more but 10% by mass or less.

* * * * *